United States Patent
King et al.

(10) Patent No.: US 8,052,286 B2
(45) Date of Patent: Nov. 8, 2011

(54) SYSTEM AND METHOD FOR UTILIZING A SCANNING BEAM TO DISPLAY AN IMAGE

(75) Inventors: Philip Scott King, Allen, TX (US); Gregory James Hewlett, Richardson, TX (US); Roger Mitsuo Ikeda, Plano, TX (US); Jeffrey Scott Farris, Flower Mound, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/074,608

(22) Filed: Mar. 29, 2011

(65) Prior Publication Data

US 2011/0211167 A1 Sep. 1, 2011

Related U.S. Application Data

(62) Division of application No. 11/832,499, filed on Aug. 1, 2007, now Pat. No. 7,918,563.

(51) Int. Cl.
*G03B 21/28* (2006.01)

(52) U.S. Cl. .............. 353/99; 353/30; 353/31; 353/32; 353/33; 353/34; 353/35; 353/36; 353/37; 353/94; 353/98; 353/119; 353/121; 353/122; 359/196.1; 359/197.1; 359/198.1; 359/199.1; 359/201.1; 359/216.1; 359/219.2; 359/223.1; 359/224.2; 359/237; 359/238; 359/239; 359/259

(58) Field of Classification Search .............. 353/30, 353/31, 32, 33, 34, 35, 36, 37, 94, 98, 99, 353/119, 121, 122; 359/196.1, 197.1, 198.1, 359/199.1, 201.1, 216.1, 219.2, 223.1, 224.2, 359/237, 238, 239, 259; 372/9, 103, 107; 345/418, 589; 347/229, 233, 234, 235, 237
See application file for complete search history.

(56) References Cited

U.S. PATENT DOCUMENTS

| | | | |
|---|---|---|---|
| 3,813,140 A | 5/1974 | Knockeart | |
| 5,313,479 A * | 5/1994 | Florence | 372/26 |
| 5,448,314 A | 9/1995 | Heimbuch et al. | |
| 5,663,749 A | 9/1997 | Farris et al. | |
| 5,737,038 A | 4/1998 | Gale et al. | |
| 6,300,924 B1 | 10/2001 | Markandey et al. | |
| 6,618,178 B2 * | 9/2003 | Engelhardt | 359/201.1 |
| 6,619,802 B2 * | 9/2003 | Janssen et al. | 353/31 |
| 6,628,318 B1 * | 9/2003 | Wada et al. | 347/240 |
| 6,987,597 B2 | 1/2006 | Hewlett et al. | |
| 7,061,512 B2 * | 6/2006 | Morgan et al. | 345/691 |
| 7,066,605 B2 | 6/2006 | Dewald et al. | |
| 7,088,353 B2 | 8/2006 | Fujii et al. | |
| 7,095,541 B2 | 8/2006 | Liu | |
| 7,369,289 B2 | 5/2008 | Tamada et al. | |
| 2002/0130980 A1 * | 9/2002 | Hewlett et al. | 348/771 |
| 2003/0030649 A1 * | 2/2003 | Sacre et al. | 345/589 |
| 2007/0058143 A1 | 3/2007 | Penn et al. | |
| 2009/0034053 A1 | 2/2009 | King | |
| 2009/0058875 A1 * | 3/2009 | Doyen et al. | 345/589 |

* cited by examiner

*Primary Examiner* — William C Dowling
*Assistant Examiner* — Sultan Chowdhury
(74) *Attorney, Agent, or Firm* — Charles A. Brill; Wade James Brady, III; Frederick J. Telecky, Jr.

(57) ABSTRACT

A method includes generating a plurality of beams that each illuminate a separate portion of a spatial light modulator. The spatial light modulator has a first dimension of a first length and a second dimension of a second length. Each of the beams spans a portion of the first length of the first dimension and a portion of the second length of the second dimension. The method also includes scrolling the plurality of beams along the second dimension of the spatial light modulator while maintaining at least a first gap between each of the plurality of beams.

12 Claims, 3 Drawing Sheets

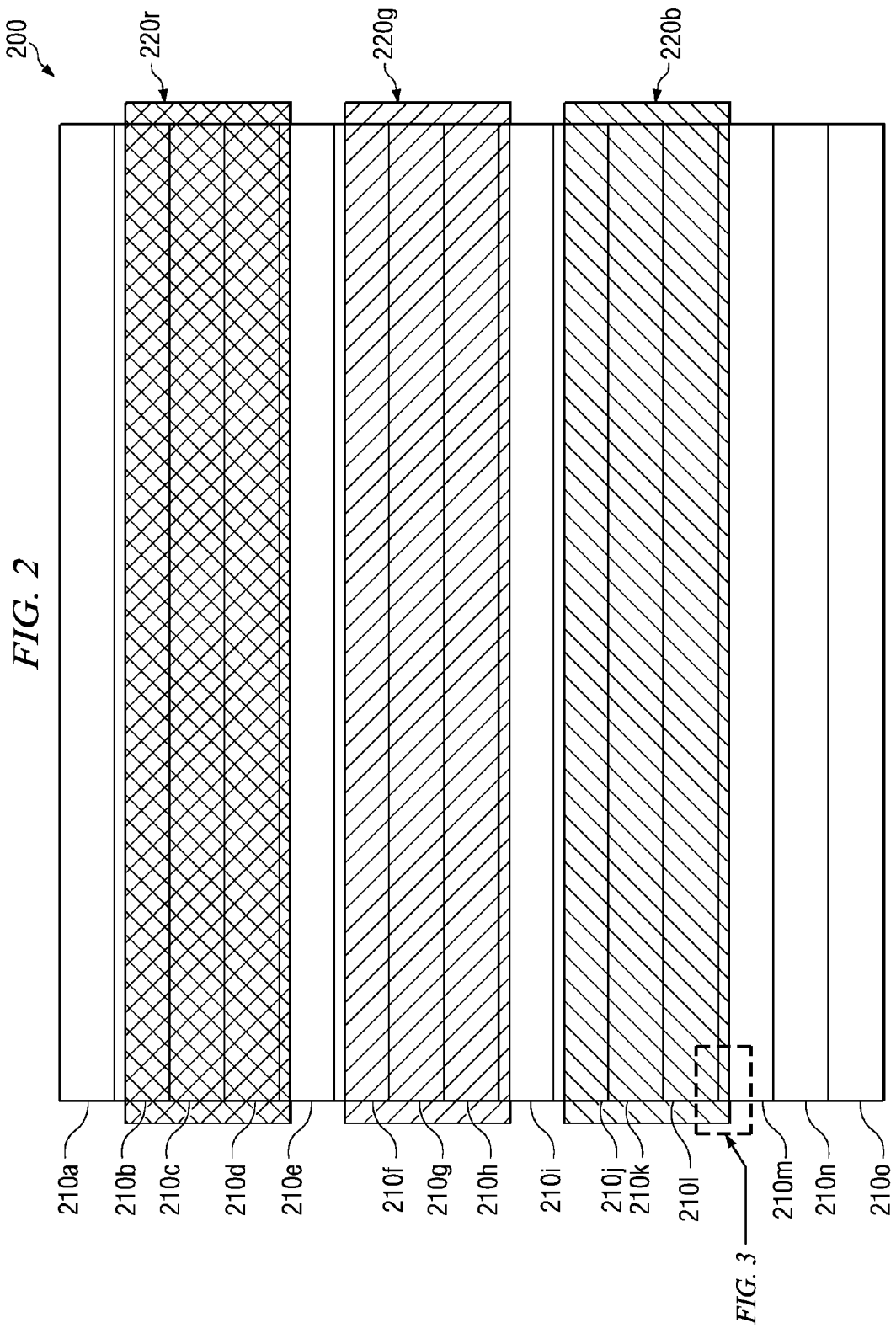

SYSTEM AND METHOD FOR UTILIZING A SCANNING BEAM TO DISPLAY AN IMAGE

This application is a divisional of application Ser. No. 11/832,499, filed Aug. 01, 2007.

TECHNICAL FIELD

This disclosure relates generally to display systems, and more particularly to a system and method for utilizing a scanning beam to display an image.

OVERVIEW

Spatial light modulators are devices that may be used in a variety of optical communication and/or video display systems. In some applications, spatial light modulators may generate an image by controlling a plurality of individual elements that control light to form the various pixels of the image. One example of a spatial light modulator is a digital micro-mirror device ("DMD"), sometimes known as a deformable micro-mirror device.

At least some spatial light modulators are illuminated completely in one color at a time. For example, a spatial light modulator may first be illuminated in red light and then it may be illuminated in green light. Because each color is done individually, the more time that is devoted to a particular color or to an additional color necessarily reduces the time available for display of the remaining colors. For example, in a three color system the spatial light modulator may only be illuminated in red light less than one-third of the time.

Each pixel of light on the screen is a combination of different colors (e.g., red, green or blue). To display the image, the spatial light modulator relies on the user's eyes to blend the different colored lights into the desired colors of the image. For example, an element of the spatial light modulator responsible for creating a purple pixel will only reflect the red and blue light to the surface. The pixel itself is a rapidly, alternating flash of the blue and red light. A person's eyes will blend these flashes in order to see the intended hue of the projected image.

SUMMARY

In accordance with the teachings of the present disclosure, a system and method for using a scanning beam to display an image are provided. In one embodiment, the method includes generating a plurality of beams that each illuminate a separate portion of a spatial light modulator. The spatial light modulator has a first dimension of a first length and a second dimension of a second length. Each of the beams spans a portion of the first length of the first dimension and a portion of the second length of the second dimension. The method also includes scrolling the plurality of beams along the second dimension of the spatial light modulator while maintaining at least a first gap between each of the plurality of beams.

In another embodiment, a display system includes a spatial light modulator that has a first dimension of a first length and a second dimension of a second length. The system also includes a plurality of light sources. Each light source generates a light beam of a different color. Each light beam illuminates the first length of the spatial light modulator and a different portion of the second length of the spatial light modulator. The system further includes a drive module that causes the plurality of light beams to scan along the second dimension of the spatial light modulator while maintaining at least a first gap between each of the plurality of light beams.

A technical advantage of some embodiments of the present disclosure includes the ability to continuously illuminate a spatial light modulator. Accordingly, a brighter image may be displayed. Another technical advantage of particular embodiments is the ability to modulate the brightness of the scanning beam. Accordingly, there may be an increase in the bit depth of the display.

Other technical advantages of the present disclosure may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIG. 2 is an enlarged block diagram of the spatial light modulator and scanning beams of FIG. 1 in accordance with particular embodiments;

DETAILED DESCRIPTION OF EXAMPLE EMBODIMENTS

Figure 1:
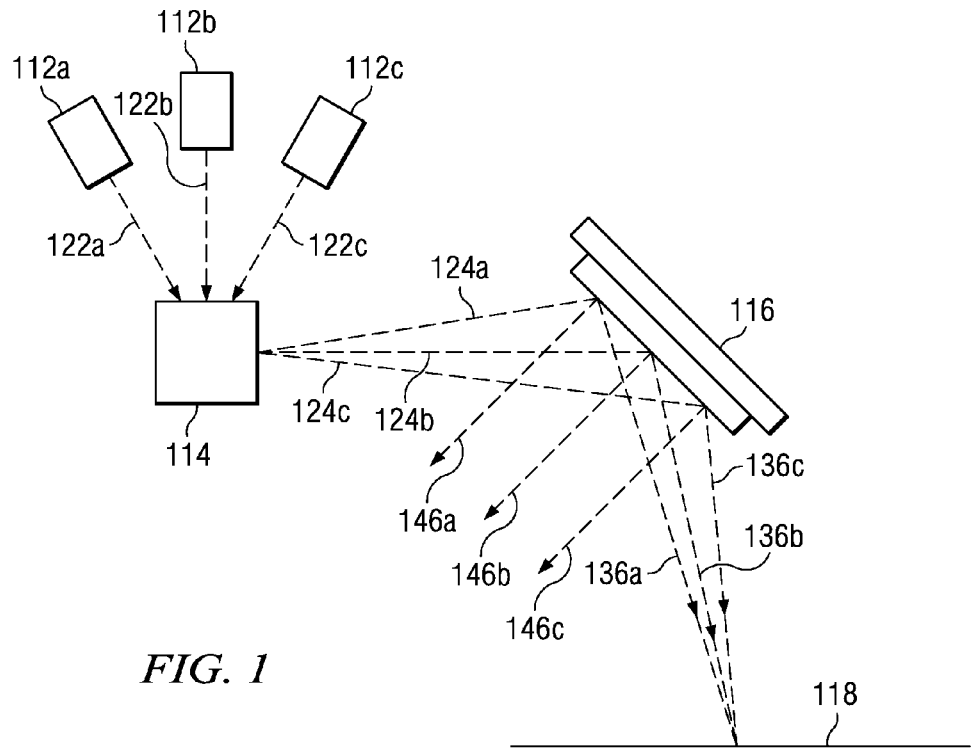
FIG. 1 is a block diagram of one embodiment of a portion of a video display system implementing a scanning beam for displaying an image, in accordance with particular embodiments.

FIG. 1 is a block diagram of one embodiment of a portion of a video display system implementing a scanning beam for displaying an image. In this example, video display system 100 includes three light sources 112, optics 114, modulator 116 and display 118. According to the teaching of example embodiments, these components may work together to display an image utilizing a scanning beam. As discussed in more detail below, light sources 112 may generate steady beams 122. Depending on the embodiment, steady beams 122 may be stationary or scanning beams, however for purposes of this embodiment and for simplicity steady beams 122 may be stationary. Steady beams 122 may then pass through optics 114 and emerge as scanning beams 124. In those embodiments in which light sources 112 generate stationary steady beams, optics 114 may cause scanning beams 122 to scroll along the surface of modulator 116. Modulator 116 may then direct a portion of scanning beams 122 towards a light dump (not shown) along off-state light paths 146 and/or a portion of scanning beams 122 towards display 118 along projection light paths 136. Similarly, in those embodiments in which light sources 112 are able to generate scanning beams, optics 114 may simply focus the scanning beams onto the surface of modulator 116. In other words, light sources 112 cause scanning beams 124 to scroll along the surface of modulator 116. Regardless of which component causes the scrolling, the movement of that component may be generated by and/or controlled by a drive module (not depicted). All three scanning beams 124 may simultaneously be illuminating their respective portion of modulator 116. This may provide for a brighter image than systems in which all of modulator 116 is illuminated by only one light source at a time. This may also provide less tolerance in terms of the speed and shape of the beams, as compared to a spoke chasing apparatus.

Light sources 112 may comprise any of a variety of different types of light sources, such as, for example, a metal halide lamp, a xenon arc lamp, an LED, a laser, etc. Each light source 112 may be capable of generating a respective steady beam 122. Each steady beam 122 may be of a different color (e.g., red, green, blue, yellow, cyan, magenta, white, etc.) or one or more colors may be repeated (e.g., there may be two red beams, one blue beam and 1 green beam). For example, in FIG. 1, light source 112a may be a red laser, light source 112b may be a green laser, and light source 112c may be a blue laser. While only three light sources 112 have been depicted, other embodiments may include additional light sources and/or additional colors. The additional colors may, for example, be used to create certain effects or to manipulate the color space.

Optics 114 may comprise a lens and/or any other suitable device, component, material or technique for bending, reflecting, refracting, focusing or otherwise manipulating steady beams 122 to produce scanning beams 124. Focusing steady beams 122 into scanning beams 124 may enable the relatively concentrated and narrow steady beams 122 to be spread across the full width of an active area of modulator 116 while only spreading across a portion of the height of the active area of modulator 116. An active area may be a portion of modulator 116 that maps to the visible area of display screen 118 driven by modulator 116 (e.g., light incident on the active area may be directed along projection light path 136 towards display screen 18). By focusing scanning beams 124 such that they only cover a portion of the height of modulator 116 it may be possible for different color scanning beams 124 to simultaneously illuminate portions of the active area of modulator 116. Because scanning beams 124 cover only a portion of the active area of modulator 116, that portion may be brighter than if one of scanning beams 124 were to cover the entire surface of the active area of modulator 116. Depending on the embodiment, optics 114 may also be able to scroll scanning beams 124 so that they scan down the height of modulator 116 or steady beams 122 may move and optics 114 may focus the scanning steady beams 122 into scanning beams 124. Combining the ability to focus multiple beams onto modulator 116 with the ability to scan the multiple beams that are simultaneously illuminating modulator 116 may allow video display system 100 to produce a brighter, clearer image than may be possible using conventional illumination techniques. In addition this may also allow for less tolerance than a spoke chasing apparatus with respect to the speed and shape of scanning beam 124. In some embodiments, optics 114 may be able to create more scanning beams 124 than steady beams 122 (e.g. optics 114 may include a prism). It may be appreciated that video display system 100 may also include additional optical components (not explicitly shown), such as, for example, lenses, mirrors and/or prisms operable to perform various functions, such as, for example, filtering, directing, and focusing beams. For example, some embodiments may use separate optics for each light source 112.

Modulator 116 may comprise any device capable of selectively communicating, for example by selective redirection, at least some of the light from scanning beams 124 along projection light path 136 and/or along off-state light path 146. In various embodiments, modulator 116 may comprise a spatial light modulator, such as, for example, a liquid crystal display (LCD) modulator, a reflective liquid crystal on silicon ("LCOS") modulator, interferometric modulator, or a light emitting diode modulator. In particular embodiments, modulator 116 may comprise a digital micro-mirror device (DMD). In some applications, modulator 116 may comprise an active area and an overscan area. The active area may be the area of modulator 116 that is responsible for creating the viewable image whereas the overscan area, which may surround all or a portion of the active area, may not produce a viewable image. In other words, as scanning beams 124 scroll along the surface of modulator 116 the active area may be able to direct scanning beams 124 along projection path 136 to create the image displayed on screen 118 whereas the overscan area may not (e.g., it may not be in a visible area).

The DMD may be a micro electro-mechanical device comprising an array of tilting micro-mirrors (the number of micro-mirrors may be based on the number of pixels to be displayed). From a flat state, the micro-mirrors may be tilted, for example, to a positive or negative angle to alternate the micro-mirrors between an "on" state and an "off" state. In particular embodiments, the micro-mirrors may tilt from +10 degrees to −10 degrees. In other embodiments, the micro-mirrors may tilt from +12 degrees to −12 degrees. To permit the micro-mirrors to tilt, each micro-mirror may be attached to one or more hinges mounted on support posts and spaced by means of an air gap over underlying control circuitry. The control circuitry provides electrostatic forces based, at least in part, on image data received from an image source (e.g., a blu-ray disc player or cable box). The electrostatic forces cause each micro-mirror to selectively tilt. Incident light illuminating the micro-mirror array may be reflected by the "on" micro-mirrors along projection path 136 for receipt by display screen 118 or it may be reflected by the "off" micro-mirrors along off-state light path 146 for receipt by a light dump (not shown). The pattern of "on" versus "off" mirrors (e.g., light and dark mirrors) forms an image that is projected onto a display screen 118. As used in this document, the terms "micro-mirrors" and "pixels" are used inter-changeably.

Display screen 118 may be any type of screen able to display a projected image. For example, in some embodiments display screen 118 may be part of a rear projection TV. In particular embodiments, display screen 118 may be a screen used with a projector, or even simply a wall (e.g. a wall painted with an appropriate color or type of paint).

FIG. 2 is an enlarged block diagram of spatial light modulator 116 and scanning beams 124 of FIG. 1 in accordance with particular embodiments. As shown in FIG. 2, modulator 200 has been divided into fifteen reset groups 210a-210o. Each reset group 210 may comprise a number of micro-mirrors which may be selectively turned "on" or "off" as discussed above. All micro-mirrors within a given reset group may be positioned to their respective "on" or "off" state at approximately the same time. Along the surface of modulator 200 are scanning beams 220. Scanning beams 220 may continuously scan or scroll along the surface of modulator 200 thereby continuously illuminating modulator 200 with multiple beams.

The size and number of reset groups 210 may vary depending on the type and configuration of modulator 200. More specifically, the number of reset groups may be as few as one or as many as the number of lines the DMD is capable of displaying. For example, in some embodiments the size of the reset group may be based on the number of micro-mirrors that modulator 200 may be able to reset at once. The size of the reset group for modulator 200 may determine the minimum size of a gap or distance between scanning beams 220 (the gap may be larger depending on the embodiment). The gap between scanning beams 220 may provide at least two benefits. First, the gap may provide a break in illumination during which the individual micro-mirrors may change states in anticipation of being illuminated by the next scanning beam, and second, the gap may provide sufficient separation between scanning beams to avoid possible color bleeding from one scanning beam into another (this may help to ensure that a micro-mirror is illuminated by only one color at a time). In some embodiments each gap may consistently track its respective scanning beam 220 as it scrolls across modulator 200. While the size of the reset group may determine the minimum size of the gap, in practice it may not decide the actual size of the gap. Particular embodiments may have gaps sized such that each of the gaps are approximately equal between all the scanning beams and some embodiments may have different sized gaps between different scanning beams.

In particular embodiments, such as the one depicted in FIG. 2, each scanning beam 220 may be one of the three primary colors. More specifically, scanning beam 220r may be red, scanning beam 220g may be green, and scanning beam 220b may be blue. Different embodiments may use different colors and/or a different number of scanning beams. As can be seen in FIG. 2, while scanning beams 220 cover the entire width of modulator 200, they only illuminate a portion of the total height of modulator 200. The portion of the height of modulator 200 that is illuminated may vary between embodiments depending on several different factors, such as the size of modulator 200, the size of reset groups 210, and the optics focusing the light source. Furthermore, there may be variances in the height of the scanning beams of a particular embodiment. For example, scanning beam 220g may be narrower (illuminate less of the height of modulator 200) than scanning beams 220r and 220b. Because of the characteristics of different optics some embodiments may not always be able to maintain scanning beams 220 in a perfectly straight or linear alignment for the duration of each scan. For example, as scanning beam 220r progresses down modulator 200 it may initially contain a slight amount of pincushion distortion which may change to a slight barrel distortion as scanning beam 220r nears the center of modulator 200 and then the slight pincushion distortion may return as it moves towards the bottom of modulator 200. This may also cause the size of the gaps between scanning beam 220 to change.

These multicolored scanning beams 220 may scroll down the surface of modulator 200 (e.g., perpendicular to reset groups 210). Depending on the embodiment, the scrolling of scanning beams 220 may be caused by a drive module coupled to the optics (e.g., optics 114), the light sources (e.g., light sources 112), or a combination of the two. As each scanning beam 220 reaches the bottom of modulator 200 (near reset group 210o) it may continue to the top of modulator 200 (near reset group 210a). For example, as the bottom edge of scanning beam 220b reaches the bottom edge of reset group 210o, an increasing portion of scanning beam 220b will begin to be at the top edge of reset group 210a. This allows for the three scanning beams 220 to continuously illuminate modulator 200.

In some embodiments, modulator 200 may include an overscan area that forms all or some of the perimeter of modulator 200. The overscan area may, in essence, surround all or some of an active area. For example, the area indicated as reset groups 210a and 210o may be overscan areas (the overscan area need not be a reset group or of the same size as a reset group) and the remaining reset groups may be the active area. The overscan area may be a part of modulator 200 but the light reflected from this area may not appear on a display screen or otherwise be presented to a user. In particular embodiments with an overscan area along the sides of modulator 200, the length of beams 220 may cover the length of the active area, but not necessarily the length modulator 200.

The term "frame" refers to a complete image displayed by modulator 200. A frame may be represented by a set of image data. Image data may comprise, for example, an image content, a color content, an integrated intensity of the image frame, a peak to peak intensity value of the image frame, and/or a subjectively weighted area, such as the center of the image. In some embodiments, image data can comprise data compiled from analyzed histogram data.

In order to produce the complete image of a single frame, scanning beams 220 may need to make several sweeps of modulator 200. Each time a scanning beam 220 sweeps across modulator 200 a unit pulse of light for the respective color is produced (e.g., each sweep may create a standard bit of weight 1.0). Each pulse of light may be combined to produce a pixel having the desired weight (e.g., if a bit weight of 6.0 is desired, then the micro-mirror may be "on" for six sweeps). Unfortunately, the bit-depth for a given pixel may be limited by the finite number of sweeps that can be performed for each frame. For example, if a video display system makes 64 sweeps per frame, then a particular pixel may only be able to achieve a bit-depth of six bits. As another example, some embodiments may divide the frame into two similar "subframes" that may contain $32/64$ of the total sweeps and thus only 32 individual levels is achievable resulting in a bit depth of five bits. Because greater bit-depth may produce more detailed images, it may be desirable to increase the bit-depth. Increasing the bit-depth of the display system may also reduce spatial contouring artifacts and/or temporal artifacts due to quantization noise.

In order to increase the bit-depth, not only may modulator 200 control the way the light pulses are combined, but the amplitude, or brightness, of scanning beams 220 may be adjusted. For example, if scanning beam 220 is set for full brightness during a first sweep, it may be set for seventy-five percent of full brightness for the next sweep. Thus, least significant bits (bit-depth may be limited by the minimum size of the least significant bit) may be created by modulating the intensity of the light to 0.5, 0.25, or any value of the total intensity. Weights of 2.0 or more may be created by combining bits of weight 1.0.

The amplitude or brightness of scanning beams 220 may be adjusted by varying the intensity of the output of the light source, using a mechanical shutter or particular optics to reduce the light output, using acousto-optic modulation, electronic control of the illumination sources, modulation through the use of a second modulator (e.g., a second DMD), or any other appropriate technique or device to reduce the intensity of scanning beams 220. In some embodiments the adjustment in the amplitude of, for example, scanning beam 220r may be done while scanning beam 220r is within the overscan area. This may help to avoid linearity problems that may result if the modulation of scanning beam 220r's amplitude was performed while it was still incident on the viewable portion of modulator 200.

Figure 3:
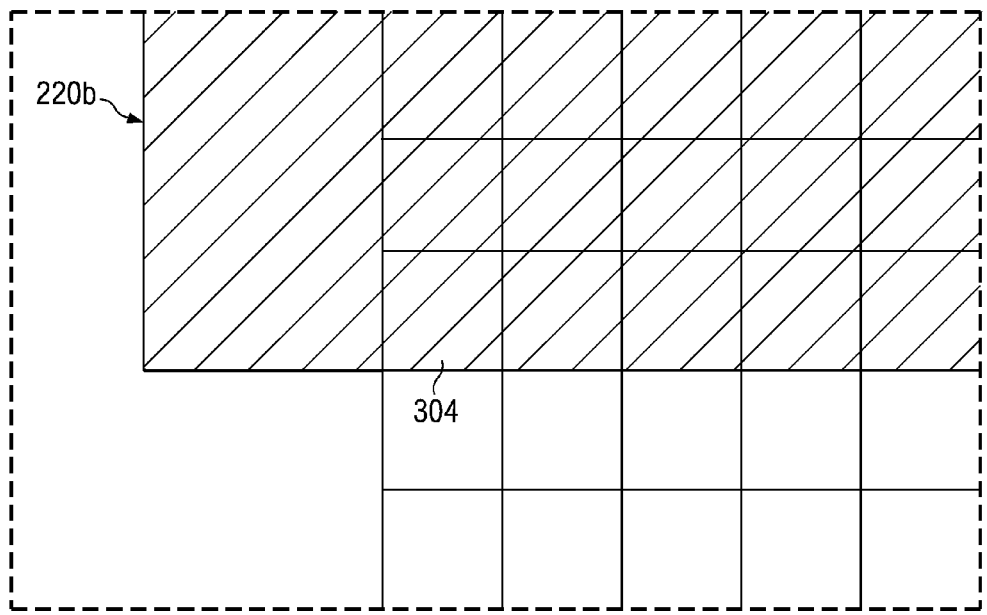
FIGS. 3 is an enlarged view of a section of the spatial light modulator depicted in FIG. 2, in accordance with particular embodiments.

FIG. 3 is an enlarged view of a section of the spatial light modulator depicted in FIG. 2, in accordance with particular embodiments. The enlarged section of the spatial light modulator depicted in FIG. 2 shows some of the millions, in one embodiment, of tilting micro-mirrors that comprise the surface of modulator 200. The size of a micro-mirror may vary depending on the embodiment. For example, in some embodiments micro-mirror 304 may be approximately 13.7 square microns or seventeen square microns. Other embodiments may have smaller or larger micro-mirrors or differently shaped micro-mirrors. There may also be a gap between the individual micro-mirrors, for example there may be an approximately one micron gap between adjacent micro-mirrors. As discussed above, each micro-mirror 304 may tilt between plus or minus ten degrees creating an active "on" state condition or an active "off" state condition. In other examples, each micro-mirror 304 may tilt, for example, between plus or minus twelve degrees for the active "on" state or "off" state. Each micro-mirror may correspond to a pixel to be displayed on a display screen.

As scanning beams 220 pass over the surface of modulator 200 each scanning beam 220 may individually pass over a particular micro-mirror. Thus, micro-mirror 304 may first be illuminated with scanning beam 220b, then scanning beam 220g and finally scanning beam 220r. Being illuminated once by each scanning beam 220 may be referred to as an illumination cycle. Depending on the configuration of the display system (e.g., the characteristics of the optical elements, mechanical elements, electronics, or modulator in use), micro-mirror may be illuminated by any number of illumination cycles per frame. For example, in a particular embodiment using red, green, and blue scanning beams, micro-mirror 304 may be illuminated by the following pattern sixty-four times per frame: red-gap-green-gap-blue-gap. Micro-mirror 304 may use the gap between each color to change its state (if necessary) between "on" and "off." Whether micro-mirror 304 is "on" or "off" for any particular pass by any of the colors may depend on the image that is to be displayed. More specifically, based on factors such as the color and brightness of the respective pixel, micro-mirror 304 may either be in the "on" state or the "off" state each time it is illuminated by one of scanning beams 220. In some instances micro-mirror 304 may be "on" for a portion of the time it is being illuminated by scanning beam 220 and "off" for the remaining time that it is being illuminated by scanning beam 220.

Figure 4:
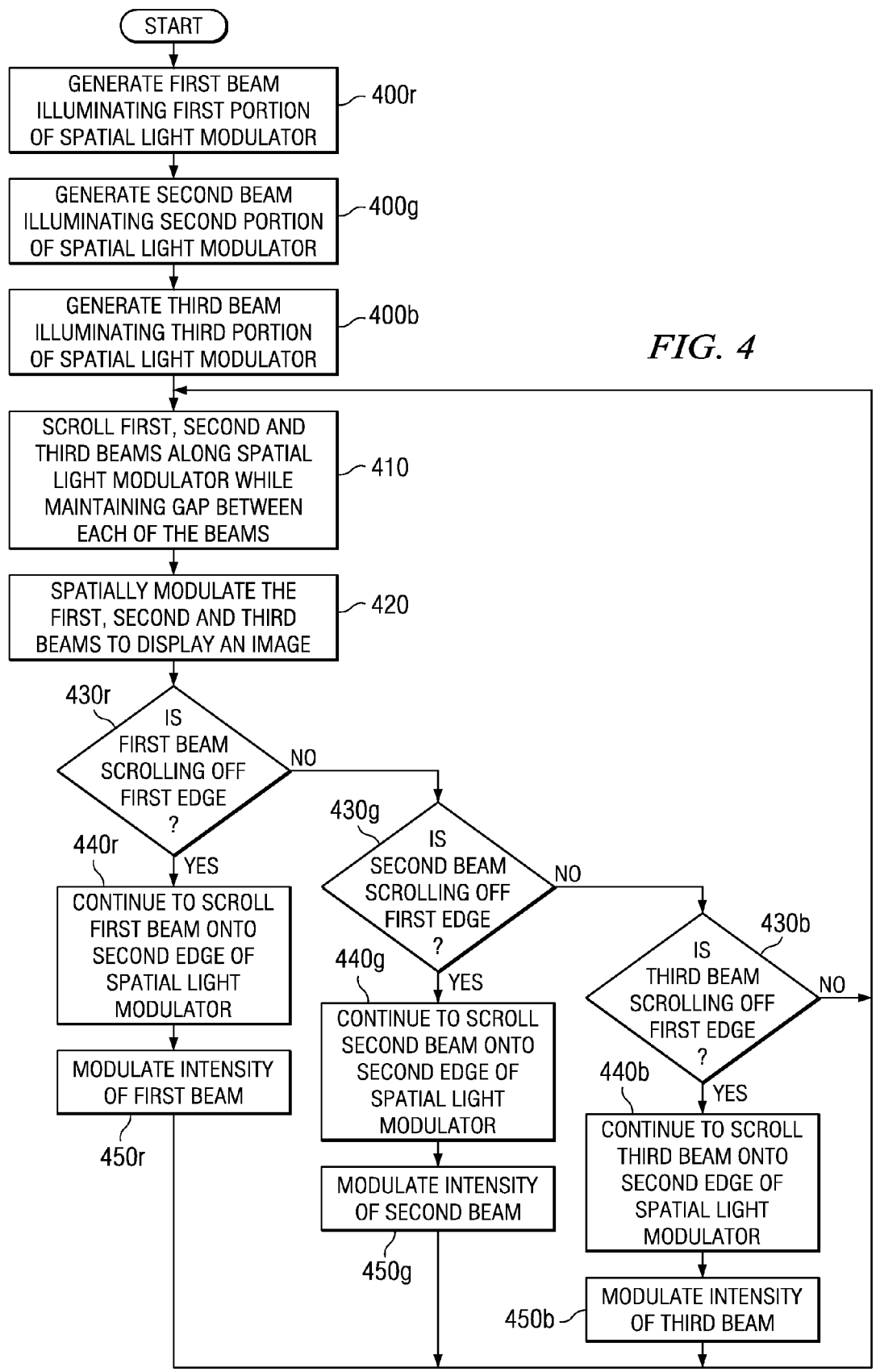
FIG. 4 is a flowchart illustrating a method for utilizing a scanning beam to display an image, in accordance with particular embodiments.

FIG. 4 is a flowchart illustrating a method for utilizing a scanning beam to display an image, in accordance with particular embodiments. This flowchart merely illustrates an example embodiment, other embodiments may use all, some or none of these steps. The method begins with the generation of three beams at steps 400r, 400g and 400b (collectively step 400). More specifically, at step 400r a first beam is generated; at step 400g a second beam is generated; and at step 400b a third beam is generated. These beams may all be generated simultaneously or sequentially. For purposes of this flowchart, it may be assumed that the first, second and third beams are red, green and blue, respectively. Other embodiments may use more and/or different colored beams. The order in which the different colored beams are generated may vary depending on the embodiment and/or operational needs of the display system. While the beams, when incident on the spatial light modulator, may be significantly rectangular in shape, deviations in the linearity may occur and may be acceptable. Furthermore, the exact shape may change as the beam scrolls along the surface of the spatial light modulator.

Each of the beams generated at step 400 may illuminate a different portion of the spatial light modulator. Thus, in this embodiment the spatial light modulator may simultaneously be illuminated by all three beams. While three different beams may be illuminating the spatial light modulator, the entire surface of the spatial light modulator may not be illuminated (see for example, FIG. 2). Because the beams are focused so as to only illuminate a portion of the total surface of the spatial light modulator, the beams may be brighter than if the same light source was used to illuminate the entire surface of the spatial light modulator.

At step 410 the first, second and third beams are scrolled along the spatial light modulator while maintaining a gap between each of the beams. The scrolling of the beams may be created by a drive module coupled to the light sources generating the beams and/or to an optical element that is focusing the beams from the light sources onto the spatial light modulator. The size of the gap may be based on the size of the spatial light modulator's reset group (e.g., how many micro-mirrors can be reset during a particular cycle). For example, the minimum size of the gap may be one reset group. This gap may allow the appropriate micro-mirrors to make any necessary change in their "on"/"off" state in anticipation of the next beam. Because the first, second and third beams are continuously scrolling along the surface of the spatial light modulator, the color of beam by which any given micro-mirror is illuminated is constantly changing. Thus, depending on the image to be displayed, that particular micro-mirror may have to change states depending on the color of the next beam. The gap between beams provides an opportunity for the micro-mirrors to make any state changes that may be necessary while the micro-mirror is not being illuminated. The gap may also provide color separation between the beams. By having a gap between each beam a pixel may only be illuminated by a single color without having color bleed in from another beam.

At step 420 the first, second and third beams are spatially modulated to display an image. The image may be formed from several separate pixels of various colors. A pixel may achieve the desired color via the appropriate combination of the first, second and third light beams. In order to blend the three colors of the first, second and third beams to achieve the desired color the corresponding micro-mirror may be illuminated by a continuously repeating cycle of first beam, gap, second beam, gap, third beam, gap. This cycle may be repeated several times per second (e.g., if the frame rate is 60 Hz and the number of illumination cycles per frame is 64 then the repetition cycle will occur at 64*60=3840 cycles per second). For example, for a particular pixel to be purple, a corresponding micro-mirror may need to be "on" when illuminated by a red beam, then transition to "off" before being illuminated by a green beam, and then transition back to "on" before being illuminated by a blue beam. Similarly to make a more red shade of purple, the micro-mirror may be "on" when illuminated by the red beam for more cycles than when illuminated by the blue beam.

At steps 430r, 430g and 430b and steps 440r, 440g and 440b if one of the first, second or third beams, respectively, scrolls off of the first edge of the spatial light modulator it is continued onto the second edge of the spatial light modulator. For example, if the first, second, and third beams were scrolling the surface of spatial light modulator 200 depicted in FIG. 2, then once the first beam began to leave the bottom edge of spatial light modulator 200 (e.g., reset group 210o) that beam would continue from the bottom edge to the top edge (e.g., reset group 210a). Thus, a portion of the beam may be at the bottom of the spatial light modulator while the remainder of the beam may be at the top of the spatial light modulator. This is repeated as each of the beams reaches the bottom edge of the spatial light modulator. Thus, the first, second and third beams continuously illuminate the spatial light modulator.

At steps 450r, 450g and 450b, the intensity of the respective beams may be modulated. This may be done as the respective beams are continuing from the first edge to the second edge of the spatial light modulator. Particular embodiments may be configured so as to allow for independent modulation at arbitrary instances (e.g., beams may be modulated at different times) and for arbitrary locations (e.g., the bottom, top or middle of the modulator). In some embodiments, the modulation may be done independently for each source (e.g., only the red beam may be modulated while the green and blue beams remain un-modulated). In some embodiments, the bottom edge and top edge of the spatial light modulator may be overscan areas (e.g., areas that are not displayed). Modulating the intensity of a beam while it is within the overscan area may help to alleviate linearity problems that may result if the beam were modulated in an active area of the spatial light modulator. Modulating the intensity of the beams increases the bit depth of color that may be displayed. For example, if a display system completes 64 cycles per frame, each pixel may be illuminated up to 64 times. If the intensity of the beam is fixed, then the pixel color can only make $1/64$ increment changes. By allowing the light intensity to be decreased by, for example $1/2$, the pixel color can make $1/128$ increment changes. This may have the effect of doubling the bit depth of the display system. As a more concrete example, assume that a particular pixel is to be displayed at $3/128$ full brightness of red. Without modulating the intensity of the red beam the display system would have to choose between $1/64$ ($2/128$) and $2/64$ ($4/128$) but by modulating the intensity of the red beam by 1/2 the display system may, for example, be at full intensity for one pass ($1/64$ or $2/128$) and at $1/2$ intensity for another pass ($1/128$) to produce a pixel that appears to be $3/128$ of full brightness. By modulating the intensity of the beams and controlling the number of times per frame that a particular micro-mirror is "on" it may be possible to create pixels of varying colors, shades, bit weight, and/or brightness. Depending on the embodiment, the intensity of the beam may be modulated using acuosto-optic modulation or by controlling the intensity of the light source.

As each of the first, second and third beams continues from the first edge to the second edge, the method may return to step 410. Thus, the first, second, and third beams are continuously scrolling across the surface of the spatial light modulator.

Although particular embodiments of the method and system of the present disclosure have been illustrated in the accompanying drawings and described in the foregoing detailed description, it will be understood that the disclosure is not limited to the embodiments disclosed, but is capable of numerous rearrangements, modifications, and substitutions without departing from the spirit of the disclosure as set forth and defined by the following claims.

What is claimed is:

1. A method for utilizing a scanning beam to display an image, comprising:
   generating a first beam that illuminates a first portion of an active area of a spatial light modulator, the spatial light modulator having a first dimension of a first length and a second dimension of a second length, the first beam spanning a portion of the first length of the first dimension and a portion of the second length of the second dimension;
   generating a second beam that illuminates a second portion of the active area of the spatial light modulator, the second beam spanning a portion of the first length of the first dimension and a portion of the second length of the second dimension;
   generating a third beam that illuminates a third portion of the active area of the spatial light modulator, the third beam spanning a portion of the first length of the first dimension and a portion of the second length of the second dimension;
   scrolling the first, second and third beams along the second dimension of the spatial light modulator while maintaining at least a first gap between each of the first, second and third beams;
   upon the first beam scrolling off a first overscan area of the spatial light modulator that is outside of the active area, continuing to scroll the first beam onto a second overscan area of the spatial light modulator that is outside of the active area such that as the portion of the first beam within the first overscan area decreases the portion of the first beam within the second overscan area increases;
   upon the second beam scrolling off a first overscan area of the spatial light modulator that is outside of the active area, continuing to scroll the second beam onto a second overscan area of the spatial light modulator that is outside of the active area such that as the portion of the second beam within the first overscan area decreases the portion of the second beam within the second overscan area increases; and
   upon the third beam scrolling off a first overscan area of the spatial light modulator that is outside of the active area, continuing to scroll the third beam onto a second overscan area of the spatial light modulator that is outside of the active area such that as the portion of the third beam within the first overscan area decreases the portion of the third beam within the second overscan area increases.

2. The method of claim 1 wherein maintaining at least the first gap between the first, second and third beams comprises maintaining at least one reset group between the first, second and third beams, the size of the reset group based on a first characteristic of the spatial light modulator.

3. The method of claim 1, wherein:
   generating a first beam that illuminates a first portion of the active area of a spatial light modulator comprises generating a first beam that continuously illuminates a first portion of the spatial light modulator;
   generating a second beam that illuminates a second portion of the active area of the spatial light modulator comprises generating a second beam that continuously illuminates a second portion of the spatial light modulator; and
   generating a third beam that illuminates a third portion of the active area of the spatial light modulator comprises generating a third beam that continuously illuminates a third portion of the spatial light modulator.

4. The method of claim 1, further comprising modulating the intensity of the first, second, and third beams.

5. The method of claim 1, further comprising spatially modulating the first, second and third beams by the spatial light modulator to display an image comprising a portion of the first, second and third beams.

6. A method for utilizing a scanning beam to display an image, comprising:
   generating a plurality of beams that each illuminate a separate portion of a spatial light modulator, the spatial light modulator having a first dimension of a first length and a second dimension of a second length, each beam spanning a portion of the first length of the first dimension and a portion of the second length of the second dimension; and
   scrolling the plurality of beams along the second dimension of the spatial light modulator while maintaining at least a first gap between each of the plurality of beams.

7. The method of claim 6, wherein:
   a first beam of the plurality of beams is a red laser beam;
   a second beam of the plurality of beams is a green laser beam; and
   a third beam of the plurality of beams is a blue laser beam.

8. The method of claim 6, wherein maintaining at least a first gap between each of the plurality of beams comprises maintaining at least one reset group between each of the plurality of beams, the size of the reset group based on a first characteristic of the spatial light modulator.

9. The method of claim 6, wherein generating a plurality of beams that each illuminate a separate portion of a spatial light modulator comprises generating a plurality of beams that each continuously illuminate a separate portion of the spatial light modulator.

10. The method of claim 6, wherein:

the spatial light modulator includes at least three areas wherein a first edge of a first area is the second length away from a second edge of a second area; and scrolling the first, second and third beams along the second dimension of the spatial light modulator comprises, upon one of the plurality of beams scrolling off the first edge, continuing the beam onto the second edge, such that as the portion of the beam within the first area decreases the portion of that beam within the second area increases.

11. The method of claim 6, further comprising modulating the intensity of at least one of the plurality of beams.

12. The method of claim 6, further comprising spatially modulating the plurality of beams by the spatial light modulator to display an image comprising a portion of at least one of the plurality of beams.

* * * * *